May 3, 1927.
C. F. FISHER
ANTISKID CHAIN
Filed Dec. 21, 1925
1,627,025
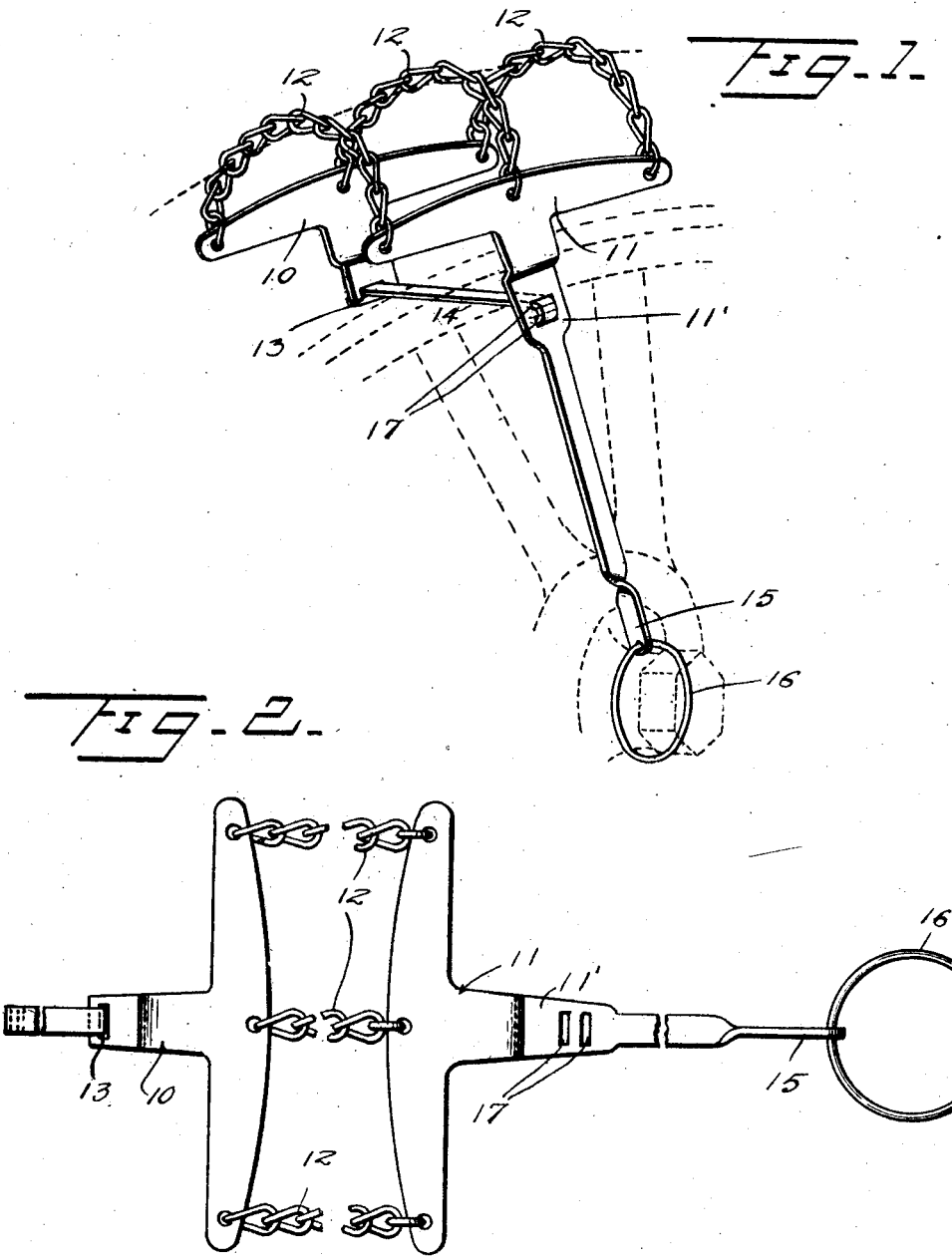

Patented May 3, 1927.

1,627,025

UNITED STATES PATENT OFFICE.

CLARENCE F. FISHER, OF LANCASTER, KANSAS.

ANTISKID CHAIN.

Application filed December 21, 1925. Serial No. 76,767.

This invention relates to new and useful improvements in attachments for vehicles, and particularly to antiskid chains.

One object of the invention is to provide a device of this character which is simple in construction, strong and durable in use, and which may be easily and quickly applied to or removed from a wheel.

Other objects and advantages will be apparent from the following description when taken in connection with the accompanying drawing.

In the drawing:

Figure 1 is a perspective view of an antiskid chain made in accordance with the present invention, and in the position assumed when on a wheel, the portion of a wheel being shown in dotted lines.

Figure 2 is a plan view of the chain in extended position.

Referring particularly to the accompanying drawing, 10 and 11 represent two approximately T-shaped plates, which are adapted to lie at opposite sides of the tire of a wheel, and connecting the ends and intermediate portions of the heads of said T-shaped members, are the cross chains 12, which chains lie across the tread of the tire. In the outer end of the leg of the member 10 there is formed a transverse slot 13, and loosely engaged in this slot is one end of a hook member 14. The leg 11', of the other T-shaped member 11 is somewhat longer than the leg of the T 10, and has its outer end twisted and provided with an eye 15, through which is engaged a hub encircling ring 16. In said leg 11', adjacent the cross member or head of the other T, there are formed the pair of transverse parallel slots 17, with which the hook member 14 is adapted to be engaged to hold the members 10 and 11 in proper position at the sides of the tire, and the cross chains 12 in position transversely of the tread of the tire. The hook member is passed transversely across the felly of a wheel, between adjacent spokes, to be engaged in the slots 17.

It will be understood that a plurality of these devices are used on each wheel of an automobile, and arranged in regularly spaced positions around the tire. Each of the legs 11' is loosely engaged with the hub encircling ring 16, and when the parts are properly assembled with relation to a wheel and tire, such parts will be held in position by the ring, and the hook members 14. The device may be easily and compactly folded, when not on the wheel, so that it may be conveniently stored in the automobile.

It will be noted that the portion of each member 10 and 11, at a suitable distance from the transverse head thereof, is offset inwardly toward the rim of the wheel, as indicated at 18, on the drawing. This maintains the said members against movement radially of the wheel.

What is claimed is:

An antiskid chain comprising a pair of T-shaped plates, chains connecting the transverse heads of the T-shaped members, the leg of one of said plates being longer than the leg of the other plate, a ring connected with the extremity of the longer leg, said longer leg having a pair of openings, the shorter leg having an opening and a hook member movably connected with the shorter leg and having its hooked end detachably engaged in said pair of openings.

In testimony whereof, I affix my signature.

CLARENCE F. FISHER.